March 10, 1936.　　　O. F. FREELAND　　　2,033,624
ELONGATION TESTING MACHINE
Original Filed Aug. 10, 1934
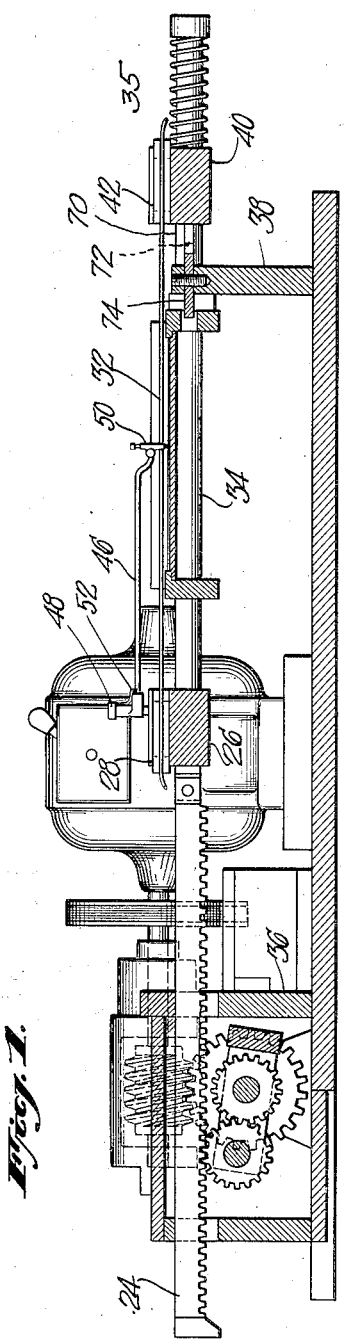
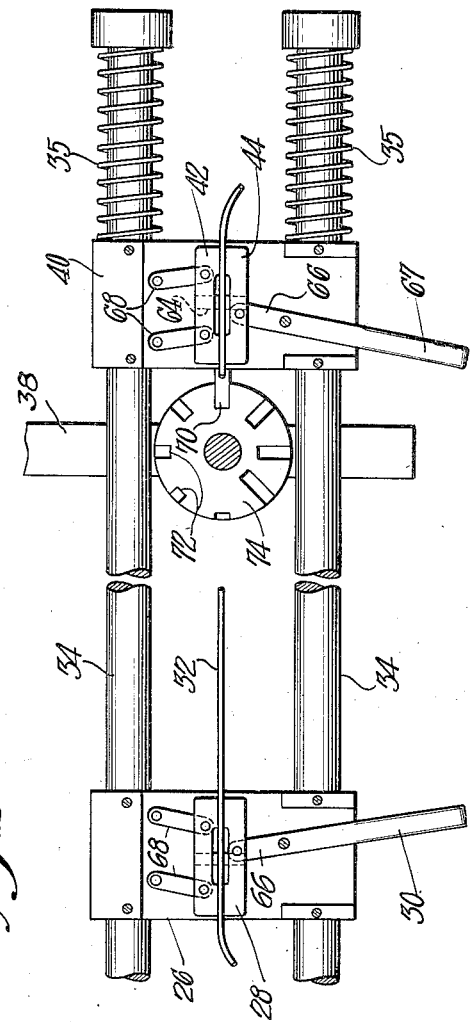
INVENTOR.
ORVILLE F. FREELAND
BY
ATTORNEYS Patented Mar. 10, 1936

2,033,624

UNITED STATES PATENT OFFICE 2,033,624

ELONGATION TESTING MACHINE

Orville F. Freeland, Muskegon, Mich., assignor to Anaconda Wire & Cable Company, New York, N. Y., a corporation of Delaware Original application August 10, 1934, Serial No. 739,212. Divided and this application June 8, 1935, Serial No. 25,536

4 Claims. (Cl. 73—51)

This application is a division of my copending application for Elongation testing machine, Serial No. 739,212, filed August 10, 1934.

The present invention is directed more particularly to the improvements in the means for engagement with the end of a test piece. The features of the present invention will be more fully apparent from the following specification when read in connection with the accompanying drawing, in which—

Fig. 1 is a longitudinal section through the testing machine shown in my above identified parent application and illustrating the operative relationship of the clamping mechanism of the test piece gripping members to the other parts of the mechanism; Fig. 2 is a plan view on an enlarged scale illustrating the clamp means and the arrangement for varying the clamping movement thereof to compensate for different sizes of material to be handled.

The testing machine disclosed in my prior application above identified, of which this case is a division includes power means for putting the test piece under tension and utilizes a stylus which travels at a rate commensurate with the rate at which the piece on the test is elongated, such stylus being adapted to automatically move transversely when the test piece is fractured. The stylus travels over a record sheet and, therefore, makes a graph which reproduces the movement of the tension element of the test machine and also records the point of the break or fracture.

The invention claimed in the present application relates particularly to the gripping or jaw means for clamping the opposite ends of the wire to be tested. These means include jaw members indicated generally at 28 and 42.

A rack 24 is adapted to reciprocate a test piece engaging member 26 which carries suitable clamp jaws 28 adapted to be actuated by a lever 30 in a manner hereinafter described, so as to clamp one end of the wire or other test piece 32. The member 26 is slidably supported on guide rods 34 secured to the frame members 36 and 38. A normally fixed test piece engaging member 40 is provided with clamp jaws 42, which are actuated by lever 67. The movable test piece engaging member 26 has pivotally supported thereon a stylus supporting element 46 and, as shown, its pivotal support includes a stud 48.

A pen, pencil, or other suitable marking member, or stylus, as indicated at 50, is secured to the end of the element 46 and a spring 52 is provided which normally tends to press the stylus laterally against the work piece under test. As thus arranged, it is clear that when the work piece being tested is fractured a transverse mark will be made by the stylus.

The jaws 28 and 42 clamping the opposite ends of the wire or other piece to be tested are preferably provided with means whereby their movement is controlled to correspond substantially with the diameter of the wire under test. The jaws are of substantially the same construction and a description of the right hand jaw shown in Fig. 2 will suffice for both. These jaws are movable toward and from one another, a transverse key piece 64 slidably engaging the two. One jaw member is pivotally secured to the short arm 66 of a lever 67 and the other jaw member is carried by a pair of parallel pivotally mounted links 68. Secured to the normally fixed member 40, there is a projection 70, which is adapted to engage in one of a plurality of notches 72 of different depths formed in the periphery of a rotatably mounted member 74. The member 40 is free to slide on the rods 34 and the springs 35 normally hold it in a desired one of several fixed positions controlled by the setting of the notched member. Thus, an exact distance can be maintained between the clamp members 28 and 44, regardless of the gauge of wire being tested.

It is important in a testing machine to maintain the same distance between the inner ends of the clamps 28 and 44 in order that a uniformity of length of test piece can be maintained. For example, as disclosed in the parent application, the test piece may be regarded as having a length of exactly ten inches. This facilitates calibration of the chart on which the test graph is made. Because the jaw members carried by the relatively fixed member 40 partake of a slight longitudinal movement due to their being mounted on pivoted links, it is apparent that unless some provision were made to compensate for this movement, when wires or other test pieces of varying diameters were held between the jaws, an exact length of test piece could not be maintained. By providing the member 74 with notches of variable depths, it will be apparent that as the member 70 carried by the member 40 coacts with the various notches to limit the movement of the member 40 under influence of the springs 35, that by properly diminishing the depths of said notches they may be so arranged as to maintain the proper spacing between the inner faces of the clamps in accordance with the varying diameters of wire adapted to be gripped thereby.

While I have described quite precisely the details of the embodiment of the invention illustrated it is to be understood that the detailed disclosure is to be interpreted in an illustrative rather than a limiting sense since various modifications may be resorted to without departure from the invention as defined in the appended claims.

What I claim is:

1. An elongation testing machine of the character described comprising spaced members one of which is normally fixed but which is initially adjustable, said one of said members having movable jaws for engagement with the end of the test piece and said jaws being so mounted on said one member as to partake of longitudinal movement in gripping test pieces of different diameters and means for limiting the initial adjustment movement of said one of said members so as to compensate for such movement of the jaws, when such different test pieces are gripped thereby.

2. An elongation testing machine for wire or the like comprising spaced members one of which is normally fixed but which is initially adjustable, one of said members having a pair of clamp jaws, links pivoted on said one of said members and connected with said jaws, so that the latter partake of longitudinal movement in gripping test pieces of different diameters and means effective to determine the position of said one of said members in accordance with the diameter of material gripped by said jaws.

3. An elongation testing machine for wire and the like comprising spaced members, one of which is normally movable relatively to the other the latter being normally fixed but initially adjustable, clamping jaws having respective links pivoted thereto and to said other of said members, a rotatably mounted element having a plurality of stop portions located at different radial distances from the center of rotation thereof and means on the member carrying said jaws which selectively coacts with said stop portions so as to control the position of the said normally fixed member.

4. An elongation testing machine comprising one member adapted to be moved to impose a load on the test piece, test piece gripping means movable with said member and adapted to grip one end of a test piece, another member normally fixed and carrying clamp jaws adapted to grip the other end of a test piece, said jaws being so mounted as to partake of a limited longitudinal movement in gripping test pieces of different diameters and means for varying the initial position of the second member so as to compensate for the longitudinal movement of the jaws carried thereby, whereby a predetermined fixed distance is maintained between said members at the start of each test.

ORVILLE F. FREELAND.